(12) United States Patent
Hatton et al.

(10) Patent No.: US 11,295,182 B2
(45) Date of Patent: Apr. 5, 2022

(54) HIGH-SPEED OCR DECODE USING DEPLETED CENTERLINES

(71) Applicant: Hand Held Products, Inc., Fort Mill, SC (US)

(72) Inventors: Edward Hatton, Yarker (CA); H. Sprague Ackley, Seattle, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 280 days.

(21) Appl. No.: 16/557,373

(22) Filed: Aug. 30, 2019

(65) Prior Publication Data

US 2019/0385027 A1 Dec. 19, 2019

Related U.S. Application Data

(62) Division of application No. 15/599,600, filed on May 19, 2017, now Pat. No. 10,438,098.

(51) Int. Cl.
*G06K 9/78* (2006.01)
*G06K 9/32* (2006.01)
(Continued)

(52) U.S. Cl.
CPC ............ *G06K 9/78* (2013.01); *G06K 9/3216* (2013.01); *G06K 9/3283* (2013.01); *G06K 9/44* (2013.01); *G06K 9/6211* (2013.01); *G06K 9/6215* (2013.01); *G06K 9/726* (2013.01); *G06K 2209/01* (2013.01)

(58) Field of Classification Search
USPC .................................................. 382/187, 209
See application file for complete search history.

(56) References Cited

U.S. PATENT DOCUMENTS 4,308,523 A * 12/1981 Schapira .............. G06K 9/6203
382/216
4,573,196 A 2/1986 Crane et al.
(Continued)

FOREIGN PATENT DOCUMENTS

WO 2013/163789 A1 11/2013
WO 2013/173985 A1 11/2013
(Continued)

OTHER PUBLICATIONS

Communication pursuant to Rules 70(2) and 70a(2) for European Application No. 18171723.2 dated Nov. 26, 2018 2 pages.
(Continued)

*Primary Examiner* — Kathleen Y Dulaney
(74) *Attorney, Agent, or Firm* — Alston & Bird LLP

(57) ABSTRACT

A method for template matching can include iteratively selecting a template set of points to project over a centerline of a candidate symbol; conducting a template matching analysis; assigning a score to each template set; and selecting a template set with a highest assigned score. For example, the score can depend on proximity of the template points to a center and/or boundaries of a principal tracing path of the symbol. Additionally, one or more template sets having a top rank can be selected for a secondary analysis of proximity of the template points to a boundary of a printing of the symbol. The method can further include using the template with the highest score to interpret the candidate symbol.

18 Claims, 6 Drawing Sheets

(51) Int. Cl.
*G06K 9/72* (2006.01)
*G06K 9/44* (2006.01)
*G06K 9/62* (2006.01)

(56) References Cited

U.S. PATENT DOCUMENTS

| | | | | |
|---|---|---|---|---|
| 4,628,533 A * | 12/1986 | Hongo | ............... | G06K 9/6202 |
| | | | | 382/205 |
| 4,872,024 A * | 10/1989 | Nagai | ................... | G06K 9/036 |
| | | | | 347/4 |
| 5,220,621 A * | 6/1993 | Saitoh | ................ | G06K 9/6205 |
| | | | | 382/200 |
| 5,267,332 A * | 11/1993 | Walch | ................ | G06K 9/4638 |
| | | | | 382/198 |
| 5,317,652 A | 5/1994 | Chatterjee | | |
| 5,341,438 A * | 8/1994 | Clifford | ................ | G06K 9/342 |
| | | | | 382/179 |
| 5,504,822 A * | 4/1996 | Holt | ..................... | G06K 9/00 |
| | | | | 382/135 |
| 5,610,996 A * | 3/1997 | Eller | ................. | G06K 9/00416 |
| | | | | 382/187 |
| 5,696,838 A * | 12/1997 | Chiu | ................... | G06K 9/3233 |
| | | | | 382/159 |
| 5,745,599 A | 4/1998 | Uchiyama et al. | | |
| 5,787,196 A * | 7/1998 | Yair | ..................... | G06K 9/342 |
| | | | | 382/178 |
| 5,956,419 A | 9/1999 | Kopec et al. | | |
| 6,081,621 A * | 6/2000 | Ackner | ................ | G06K 9/186 |
| | | | | 382/209 |
| 6,240,209 B1 * | 5/2001 | Wilcke | ................ | G06K 9/48 |
| | | | | 382/198 |
| 6,628,808 B1 * | 9/2003 | Bach | ................... | G06K 9/036 |
| | | | | 235/380 |
| 6,654,487 B1 * | 11/2003 | Downs, Jr. | ............... | G06K 9/03 |
| | | | | 382/139 |
| 6,665,441 B1 * | 12/2003 | Nishio | ................ | G06K 9/6202 |
| | | | | 382/209 |
| 6,731,803 B1 | 5/2004 | Aharonson et al. | | |
| 6,832,725 B2 | 12/2004 | Gardiner et al. | | |
| 7,039,240 B2 * | 5/2006 | Greene | ................. | G06K 9/6297 |
| | | | | 382/229 |
| 7,128,266 B2 | 10/2006 | Zhu et al. | | |
| 7,159,783 B2 | 1/2007 | Walczyk et al. | | |
| 7,227,995 B1 | 6/2007 | Reihani | | |
| 7,251,365 B2 | 7/2007 | Fux et al. | | |
| 7,413,127 B2 | 8/2008 | Ehrhart et al. | | |
| 7,724,956 B2 | 5/2010 | Walch | | |
| 7,724,958 B2 | 5/2010 | Walch | | |
| 7,726,575 B2 | 6/2010 | Wang et al. | | |
| 7,889,926 B2 | 2/2011 | Kimura et al. | | |
| 8,294,969 B2 | 10/2012 | Plesko | | |
| 8,306,328 B2 | 11/2012 | Jakubiak et al. | | |
| 8,317,105 B2 | 11/2012 | Kotlarsky et al. | | |
| 8,322,622 B2 | 12/2012 | Liu | | |
| 8,366,005 B2 | 2/2013 | Kotlarsky et al. | | |
| 8,371,507 B2 | 2/2013 | Haggerty et al. | | |
| 8,376,233 B2 | 2/2013 | Horn et al. | | |
| 8,381,979 B2 | 2/2013 | Franz | | |
| 8,390,909 B2 | 3/2013 | Plesko | | |
| 8,401,298 B2 | 3/2013 | Suwa | | |
| 8,408,464 B2 | 4/2013 | Zhu et al. | | |
| 8,408,468 B2 | 4/2013 | Van et al. | | |
| 8,408,469 B2 | 4/2013 | Good | | |
| 8,424,768 B2 | 4/2013 | Rueblinger et al. | | |
| 8,448,863 B2 | 5/2013 | Xian et al. | | |
| 8,457,013 B2 | 6/2013 | Essinger et al. | | |
| 8,459,557 B2 | 6/2013 | Havens et al. | | |
| 8,469,272 B2 | 6/2013 | Kearney | | |
| 8,474,712 B2 | 7/2013 | Kearney et al. | | |
| 8,479,992 B2 | 7/2013 | Kotlarsky et al. | | |
| 8,490,877 B2 | 7/2013 | Kearney | | |
| 8,494,272 B2 | 7/2013 | Sekino | | |
| 8,517,271 B2 | 8/2013 | Kotlarsky et al. | | |
| 8,523,076 B2 | 9/2013 | Good | | |
| 8,528,818 B2 | 9/2013 | Ehrhart et al. | | |
| 8,544,737 B2 | 10/2013 | Gomez et al. | | |
| 8,548,420 B2 | 10/2013 | Grunow et al. | | |
| 8,550,335 B2 | 10/2013 | Samek et al. | | |
| 8,550,354 B2 | 10/2013 | Gannon et al. | | |
| 8,550,357 B2 | 10/2013 | Kearney | | |
| 8,556,174 B2 | 10/2013 | Kosecki et al. | | |
| 8,556,176 B2 | 10/2013 | Van et al. | | |
| 8,556,177 B2 | 10/2013 | Hussey et al. | | |
| 8,559,767 B2 | 10/2013 | Barber et al. | | |
| 8,561,895 B2 | 10/2013 | Gomez et al. | | |
| 8,561,903 B2 | 10/2013 | Sauerwein, Jr. | | |
| 8,561,905 B2 | 10/2013 | Edmonds et al. | | |
| 8,565,107 B2 | 10/2013 | Pease et al. | | |
| 8,571,307 B2 | 10/2013 | Li et al. | | |
| 8,579,200 B2 | 11/2013 | Samek et al. | | |
| 8,583,924 B2 | 11/2013 | Caballero et al. | | |
| 8,584,945 B2 | 11/2013 | Wang et al. | | |
| 8,587,595 B2 | 11/2013 | Wang | | |
| 8,587,697 B2 | 11/2013 | Hussey et al. | | |
| 8,588,869 B2 | 11/2013 | Sauerwein et al. | | |
| 8,590,789 B2 | 11/2013 | Nahill et al. | | |
| 8,596,539 B2 | 12/2013 | Havens et al. | | |
| 8,596,542 B2 | 12/2013 | Havens et al. | | |
| 8,596,543 B2 | 12/2013 | Havens et al. | | |
| 8,599,271 B2 | 12/2013 | Havens et al. | | |
| 8,599,957 B2 | 12/2013 | Peake et al. | | |
| 8,600,158 B2 | 12/2013 | Li et al. | | |
| 8,600,167 B2 | 12/2013 | Showering | | |
| 8,602,309 B2 | 12/2013 | Longacre et al. | | |
| 8,608,053 B2 | 12/2013 | Meier et al. | | |
| 8,608,071 B2 | 12/2013 | Liu et al. | | |
| 8,611,309 B2 | 12/2013 | Wang et al. | | |
| 8,615,487 B2 | 12/2013 | Gomez et al. | | |
| 8,621,123 B2 | 12/2013 | Caballero | | |
| 8,622,303 B2 | 1/2014 | Meier et al. | | |
| 8,628,013 B2 | 1/2014 | Ding | | |
| 8,628,015 B2 | 1/2014 | Wang et al. | | |
| 8,628,016 B2 | 1/2014 | Winegar | | |
| 8,629,926 B2 | 1/2014 | Wang | | |
| 8,630,491 B2 | 1/2014 | Longacre et al. | | |
| 8,635,309 B2 | 1/2014 | Berthiaume et al. | | |
| 8,636,200 B2 | 1/2014 | Kearney | | |
| 8,636,212 B2 | 1/2014 | Nahill et al. | | |
| 8,636,215 B2 | 1/2014 | Ding et al. | | |
| 8,636,224 B2 | 1/2014 | Wang | | |
| 8,638,806 B2 | 1/2014 | Wang et al. | | |
| 8,640,958 B2 | 2/2014 | Lu et al. | | |
| 8,640,960 B2 | 2/2014 | Wang et al. | | |
| 8,643,717 B2 | 2/2014 | Li et al. | | |
| 8,646,692 B2 | 2/2014 | Meier et al. | | |
| 8,646,694 B2 | 2/2014 | Wang et al. | | |
| 8,657,200 B2 | 2/2014 | Ren et al. | | |
| 8,659,397 B2 | 2/2014 | Vargo et al. | | |
| 8,668,149 B2 | 3/2014 | Good | | |
| 8,678,285 B2 | 3/2014 | Kearney | | |
| 8,678,286 B2 | 3/2014 | Smith et al. | | |
| 8,682,077 B1 * | 3/2014 | Longacre, Jr. | ......... | G06K 9/481 |
| | | | | 382/181 |
| D702,237 S | 4/2014 | Oberpriller et al. | | |
| 8,687,282 B2 | 4/2014 | Feng et al. | | |
| 8,692,927 B2 | 4/2014 | Pease et al. | | |
| 8,695,880 B2 | 4/2014 | Bremer et al. | | |
| 8,698,949 B2 | 4/2014 | Grunow et al. | | |
| 8,702,000 B2 | 4/2014 | Barber et al. | | |
| 8,717,494 B2 | 5/2014 | Gannon | | |
| 8,720,783 B2 | 5/2014 | Biss et al. | | |
| 8,723,804 B2 | 5/2014 | Fletcher et al. | | |
| 8,723,904 B2 | 5/2014 | Marty et al. | | |
| 8,727,223 B2 | 5/2014 | Wang | | |
| 8,740,082 B2 | 6/2014 | Wilz, Sr. | | |
| 8,740,085 B2 | 6/2014 | Furlong et al. | | |
| 8,746,563 B2 | 6/2014 | Hennick et al. | | |
| 8,750,445 B2 | 6/2014 | Peake et al. | | |
| 8,752,766 B2 | 6/2014 | Xian et al. | | |
| 8,756,059 B2 | 6/2014 | Braho et al. | | |
| 8,757,495 B2 | 6/2014 | Qu et al. | | |
| 8,760,563 B2 | 6/2014 | Koziol et al. | | |
| 8,763,909 B2 | 7/2014 | Reed et al. | | |

(56) References Cited

U.S. PATENT DOCUMENTS

| | | |
|---|---|---|
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,995,770 B2 | 3/2015 | Kennard et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| D783,601 S | 4/2017 | Schulte et al. |
| D785,617 S | 5/2017 | Bidwell et al. |
| D785,636 S | 5/2017 | Oberpriller et al. |
| D790,505 S | 6/2017 | Vargo et al. |
| D790,546 S | 6/2017 | Zhou et al. |
| D790,553 S | 6/2017 | Fitch et al. |
| 9,857,167 B2 | 1/2018 | Jovanovski et al. |
| 9,891,612 B2 | 2/2018 | Charpentier et al. |
| 9,892,876 B2 | 2/2018 | Bandringa |
| 9,978,088 B2 | 5/2018 | Pape |
| 10,007,112 B2 | 6/2018 | Fitch et al. |
| 10,066,982 B2 | 9/2018 | Ackley et al. |
| 10,360,728 B2 | 7/2019 | Venkatesha et al. |
| 10,401,436 B2 | 9/2019 | Young et al. |
| 10,438,098 B2 | 10/2019 | Hatton et al. |
| 2003/0190074 A1* | 10/2003 | Loudon ............... G06K 9/6297 382/187 |
| 2005/0152601 A1* | 7/2005 | Chen ................... G06K 9/222 382/187 |
| 2005/0163377 A1* | 7/2005 | Walch ................. G06K 9/00161 382/187 |

(56) References Cited

U.S. PATENT DOCUMENTS

| | | |
|---|---|---|
| 2006/0193519 A1 | 8/2006 | Sternby |
| 2007/0063048 A1 | 3/2007 | Havens et al. |
| 2007/0172108 A1 | 7/2007 | Adelberg et al. |
| 2008/0253659 A1 | 10/2008 | Walch |
| 2009/0016608 A1 | 1/2009 | Fujimoto et al. |
| 2009/0017765 A1 | 1/2009 | Lev |
| 2009/0110264 A1 | 4/2009 | Hayashi |
| 2009/0134221 A1 | 5/2009 | Zhu et al. |
| 2009/0316990 A1 | 12/2009 | Nakamura et al. |
| 2010/0054602 A1 | 3/2010 | Kaehler |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0189362 A1* | 7/2010 | Jakubiak ............... G06F 40/109 382/203 |
| 2010/0296734 A1* | 11/2010 | Doll ....................... G06K 9/342 382/192 |
| 2011/0169999 A1 | 7/2011 | Grunow et al. |
| 2011/0202554 A1 | 8/2011 | Powilleit et al. |
| 2011/0235906 A1* | 9/2011 | Hashimoto .......... H04N 1/3935 382/165 |
| 2012/0051645 A1 | 3/2012 | Sun |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0283282 A1 | 9/2014 | Dye et al. |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |

(56) References Cited

U.S. PATENT DOCUMENTS

| | | |
|---|---|---|
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2015/0371100 A1 | 12/2015 | Wshah et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0294779 A1 | 10/2016 | Yeakley et al. |
| 2016/0306769 A1 | 10/2016 | Kohtz et al. |
| 2016/0314294 A1 | 10/2016 | Kubler et al. |
| 2016/0323310 A1 | 11/2016 | Todeschini et al. |
| 2016/0330218 A1 | 11/2016 | Hussey et al. |
| 2016/0343176 A1 | 11/2016 | Ackley |
| 2016/0377414 A1 | 12/2016 | Thuries et al. |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

Li Ning: "An Implementation of OCR System Based on Skeleton Matching", Jan. 1, 1993 (Jan. 1, 1993), XP055508716, Retrieved from the Internet: URL:https://kar.kent.ac.uk/21129/1/0CRNing.pdf [retrieved on Sep. 21, 2018].

N. Arica et al: "Optical character recognition for cursive handwriting", IEEE Transactions on Pattern Analysis and Machine Intelligence, vol. 24, No. 6, Aug. 7, 2002 (Aug. 7, 2002), pp. 801-813.

Non-Final Rejection dated Apr. 1, 2019 for U.S. Appl. No. 15/599,600.

Notice of Allowance and Fees Due (PTOL-85) dated May 30, 2019 for U.S. Appl. No. 15/599,600.

Requirement for Restriction/Election dated Jan. 17, 2019 for U.S. Appl. No. 15/599,600.

Search Report in related European Application No. 18171723.2 dated Oct. 4, 2018, pp. 1-9.

Trahanias P E et al: "Morphological Hand-Printed Character Recognition by a Skeleton-Matching Algorithm", Journal of Electronic Imaging, S P I E—International Society for Optical Engineering, US, vol. 2, No. 2, Apr. 1, 1993 (Apr. 1, 1993), pp. 114-125, XP000369377, ISSN: 1017-9909, DOI: 10.1117/12.143731.

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

U.S. Patent Application for Multifunction Point of Sale Apparatus With Optical Signature Capture filed Jul. 30, 2014 (Good et al.), U.S. Appl. No. 14/446,391.

U.S. Patent Application for Multipurpose Optical Reader, filed May 14, 2014 (Jovanovski et al.); 59 pages; now abandoned., U.S. Appl. No. 14/277,337.

Annex to the communication dated Aug. 27, 2020 for EP Application No. 18171723.

Communication from the Examining Division dated Aug. 27, 2020 for EP Application No. 18171723.

U.S. Appl. No. 15/599,600, filed Aug. 30, 2019, U.S. Pat. No. 10,438,098, Patented.

* cited by examiner

HIGH-SPEED OCR DECODE USING DEPLETED CENTERLINES

CROSS-REFERENCE TO RELATED APPLICATIONS

This application is a divisional of U.S. patent application Ser. No. 15/599,600, filed May 19, 2017, which is incorporated herein by reference in its entirety.

FIELD OF THE INVENTION

The present invention relates to optical character recognition using image-processing techniques, and more particularly to methods for template matching and symbol interpretation.

BACKGROUND

Generally speaking, optical character recognition (OCR) attempts to decode symbols using image-processing techniques. Typically, such an approach is time-consuming, as it involves moving outline templates around, and performing calculations for each position. A high-speed method capable of efficient optical character recognition is needed.

Several attempts have been made to improve optical character recognition. For example, U.S. Pat. No. 5,317,652 by Chatterjee discloses a character recognition system implementing concurrent processing and vector correlation. Specifically, a character image in a buffer is vector-correlated with character templates represented as discrete character skeletons comprised of dots. Although the reference discloses comparison of dots around a centerline template, it does not mention assigning template scores based on the number of dots inside or outside the printed character. U.S. Pat. No. 7,724,958 by Walch discloses a biometric handwriting identification system for converting characters and a writing sample into mathematical graphs, followed by using optical character recognition to identify features in the handwriting sample. The reference mentions using OCR to compare centerlines of stored and current images. However, to score a character match the template is superimposed over the actual image, and pixels of the actual image are then analyzed. The method does not use an analysis of a limited set of points to score a character match. U.S. Pat. No. 6,628,808 by Bach et al. discloses a method of verifying a scanned image using a topological analysis. To score a character match at a given candidate location, a template is superimposed over an actual image, and pixels on the actual image falling beneath the centerline pixels on the template are analyzed. Similar to U.S. Pat. No. 7,724,958, the method relies on pixel analysis, and does not mention centerline analysis conducted with a limited set of points, and may therefore be rather time-consuming.

Therefore, a need exists for a quick and efficient template-matching method having OCR decoding time comparable to barcode scanning time.

SUMMARY

Accordingly, the present invention embraces methods for template matching and symbol interpretation.

In an exemplary embodiment, a method for character interpretation includes iteratively selecting a centerline template to cast over a character; determining positions of each member of the centerline template with respect to a principal tracing path of the character; assessing score of the projected template; selecting a centerline template having highest score, and interpreting the character using the selected template.

In another exemplary embodiment, a method for template matching includes iteratively selecting a template set of points to project over a centerline of a candidate character; conducting a template matching analysis, and assigning a score to each template; and selecting a template set with a highest assigned score.

In yet another exemplary embodiment, the present invention embraces a method for symbol recognition. The method includes selecting a point array, and projecting it onto an image of a symbol; determining a rank of the array based on a primary analysis of positions of array points with respect to a printing of the symbol; repeating the process to assign a rank to each point array of a set of point arrays; selecting one or more point arrays having a top rank to conduct a secondary analysis of proximity of the array points to a boundary of the printing of the symbol; and using results of the secondary analysis to select a point array for symbol recognition.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces methods for optical character recognition (OCR) using image-processing techniques.

Figure 1A:
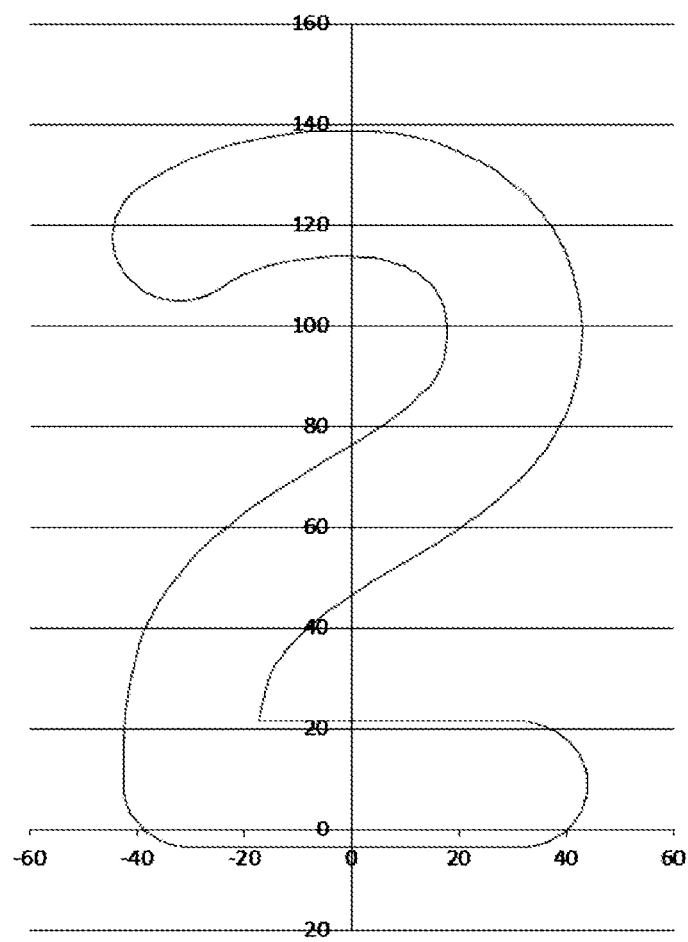
FIG. 1A schematically depicts an exemplary embodiment of typical template for OCR decoding.

OCR decoding described in the prior art often comprises a template-match algorithm where an outline of each character is moved around a candidate character until a best fit is obtained. The fit may then be scored as to how much of the character is inside the outline. The template with the best score is considered the decode of the text character. FIG. 1A shows a typical template that may be used for OCR decoding, namely an OCRB font character "2". The scale is in 2 micron increments, e.g., "100" on the Y-axis is 2 mm from (0, 0). The template comprises approximately 200 points, which results in high processing burden. While some template algorithms may use fewer points and/or vectors, the improvement in processing efficiency is not significant.

Figure 1B:
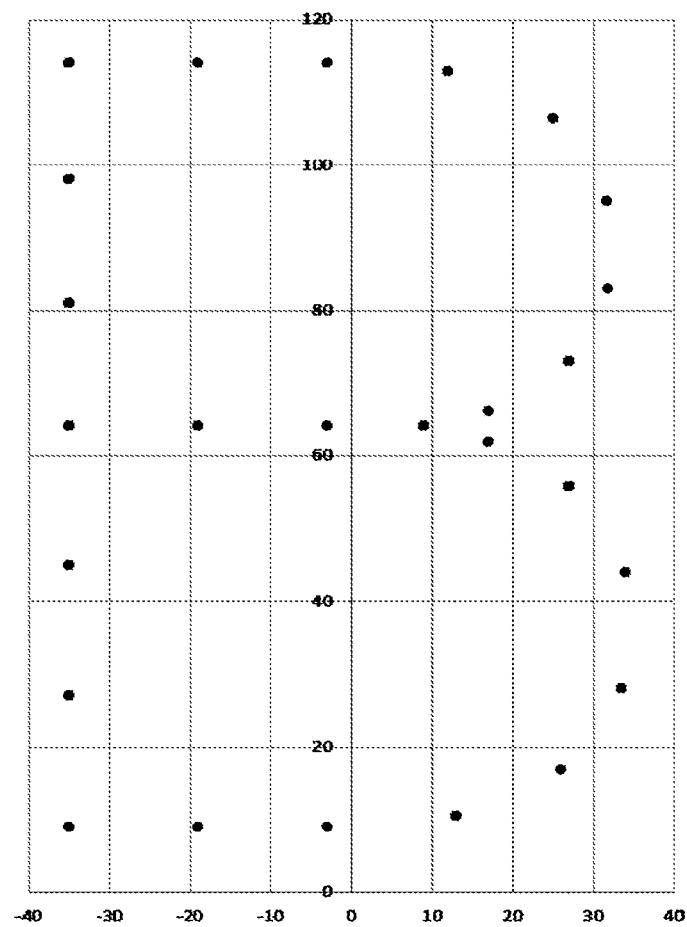
FIG. 1B schematically depicts an exemplary embodiment of a depleted centerline template.

On the contrary, the present invention, while still using the template method, focuses on the character centerline, thus noticeably reducing the required number of points. Additionally, if a depleted centerline is used, the number of points can be as low as about 20. FIG. 1B shows an exemplary embodiment of a depleted centerline template. The template is an OCRB font character "B". A similar centerline template may be used for other fonts. The resulting vast reduction in the number of points may lead to significantly improved processing time, compared to the conventional outline template methods.

In the template outline methods that include character scores, printed matter outside the template may lead to lower scores. While the centerline method of the present invention can have this feature also, it is possible for part of the centerline template to be "just barely" in a character and still score well in that part, when in fact, the template is not an optimal match.

Figure 1C:
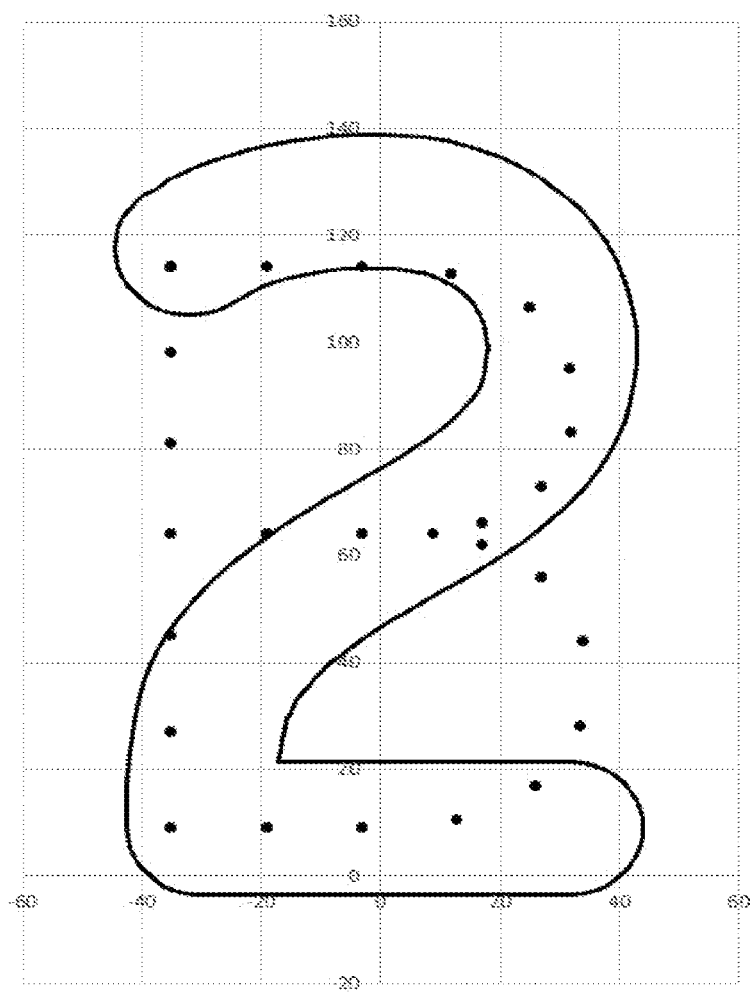
FIG. 1C schematically depicts a combination of templates in FIGS. 1A and 1B plotted on the same axes.

FIG. 1C shows an image where the templates in FIGS. 1A and 1B are plotted on the same axis, so that the centerline of the character "B" is overlaid on the template-outline of the "2" (note that in the OCRB set, all the numerals are taller than all the alpha characters by about 10%). Assuming the "2" was perfectly printed within the template boundaries, one can see that there are several places where the "B" centerline may yield a positive result, although the template centerline is near the edge of the character. For example, the entire top of the "B" centerline falls within the printed "2", yet it is far from the center of the "2". Similarly, the same issue is true for the points forming a bottom-left vertical line of the "B". To deemphasize these types of overlaps, while maintaining the good parts, such as the points forming a bottom straight line of the "B", several solutions are possible.

For example, to further improve the match while taking only a small amount of processing power, the method can include adding a parameter to the centerline score describing how close to a character boundary the centerline is. For instance, the top of the "B" is very close to a character boundary, whereas the bottom straight line formed by the points of the template is approximately equidistant from two character boundaries.

Additionally, for character centerline templates with a reasonably good score, a secondary calculation can be performed. For example, the "B" has a moderate score with the "2", and would likely also have a moderate score with an "8" and an "E". Therefore, after the primary centerline template processing is complete (which may be quite fast), the top few match candidates can be submitted for the secondary check of boundary proximity. Such an approach may produce results comparable to those acquired with an outline template match, while only needing to perform the calculations on a small number of candidate characters.

Additionally, the method can include generating a circle of diameter of the approximate stroke width around the few candidate characters. The result may be similar to that of performing a complete template outline test on the reduced point count centerline. The method can include keeping track of the local slope of the centerline and generating a vector perpendicular to each point in the centerline and measuring how far the character boundary is at that point. The slope method may be even faster than the circle method. Additionally or alternatively, other methods of determining the quality of a test point within an unknown character can be utilized.

In addition to OCRB font, the method described herein can be applied to other fonts as well. The invention can be used with human-readable digits below an EAN/UPC symbols as well as with OCR reading applications, such as passport and license plate reading.

Figure 2:
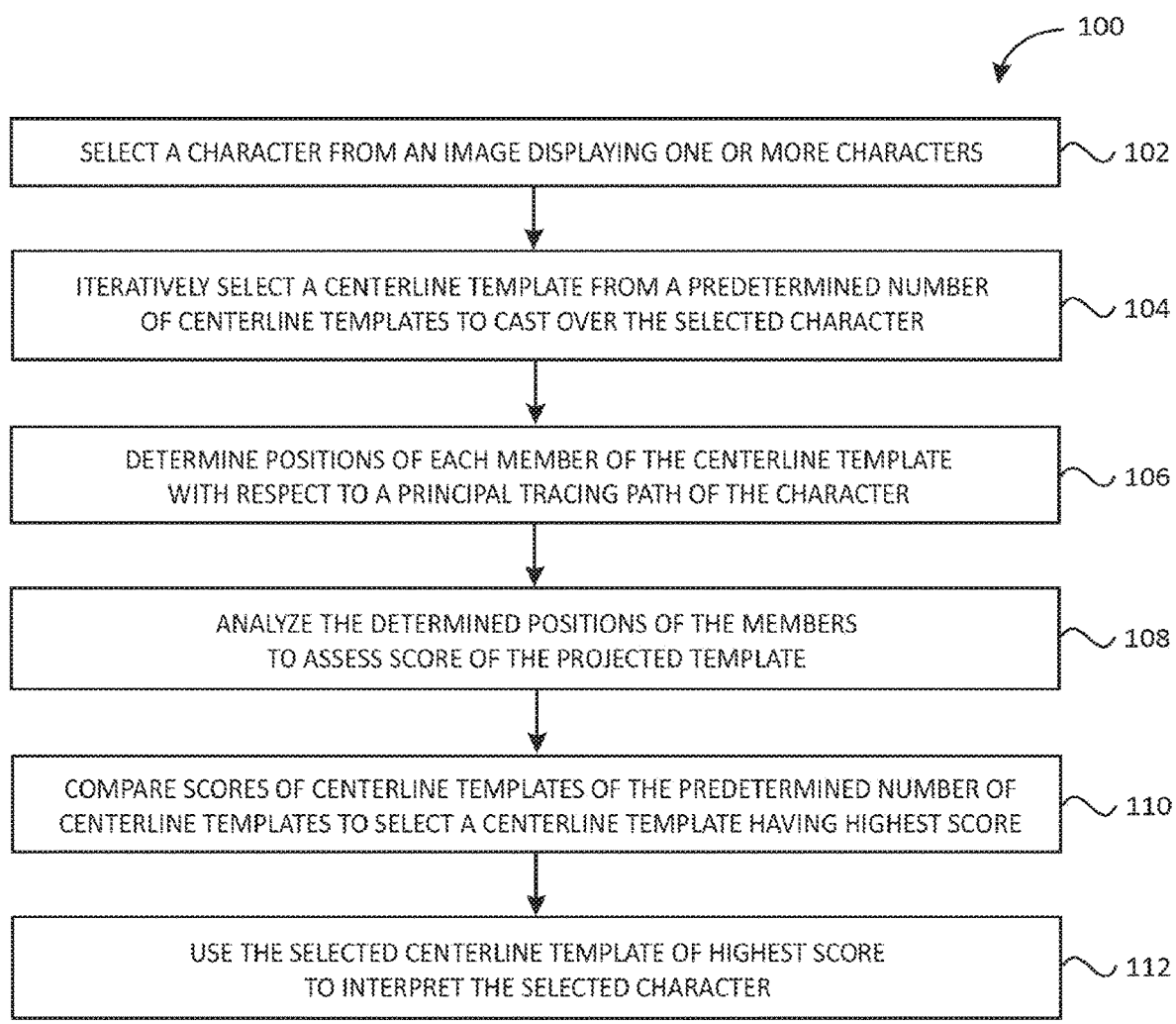
FIG. 2 schematically depicts a method for character interpretation, according to an embodiment.

FIG. 2 shows a method 100 for character interpretation, according to an embodiment. At 102, a character is selected from an image displaying one or more characters. At 104, a centerline template is iteratively selected from a predetermined number of centerline templates to cast over the selected character. At 106, positions of each member of the centerline template are determined with respect to a principal tracing path of the character. At 108, the determined positions of the members are analyzed to assess score of the projected template. At 110, scores of centerline templates of the predetermined number of centerline templates are compared to select a centerline template having highest score. And at 112, the selected centerline template of highest score is used to interpret the selected character.

In an embodiment, assessing score at 108 can include calculating proximity of the centerline template members to a center of the principal tracing path. Additionally or alternatively, assessing score at 108 can include calculating proximity of the centerline template members to one or more boundaries of the character. Additionally or alternatively, assessing score at 108 can include determining a distance to one or more boundaries of the character with respect to series of rays emanating outwards from one or more points.

Figure 3:
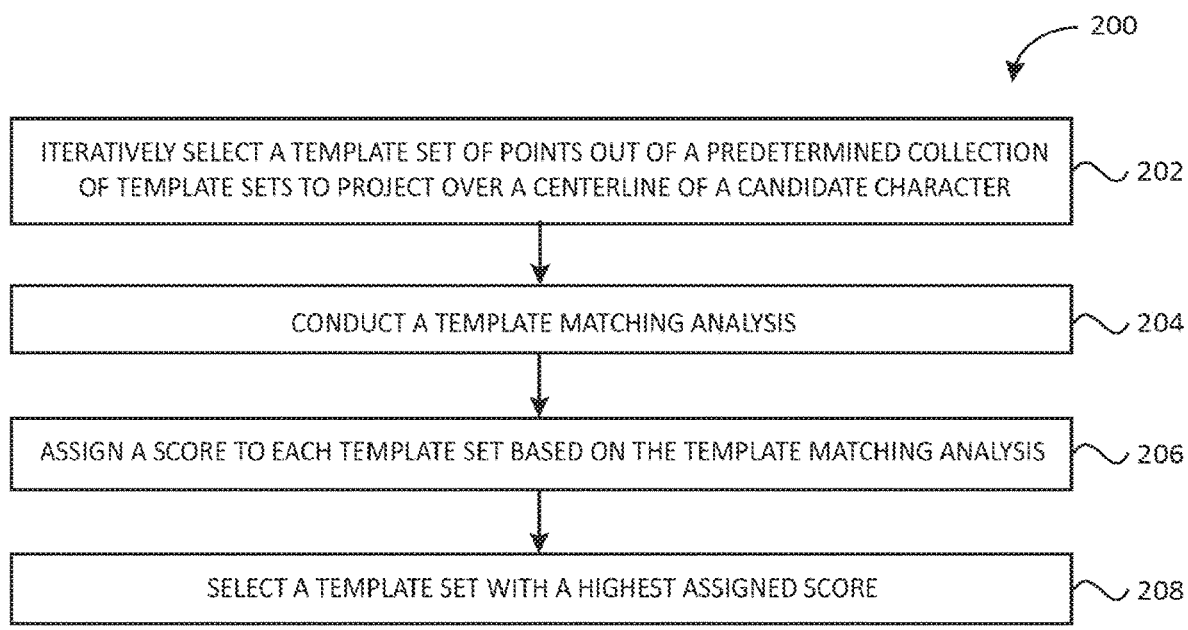
FIG. 3 schematically depicts a method for template matching, according to an embodiment.

FIG. 3 shows a method 200 for template matching, according to an embodiment. At 202, a template set of points is iteratively selected out of a predetermined collection of template sets to project over a centerline of a candidate character. At 204, a template matching analysis is conducted. At 206, a score is assigned to each template set based on the template matching analysis. And at 208, a template set with a highest assigned score is selected.

In an embodiment, conducting a template matching analysis at 204 can include counting a number of points overlapping with a printing of the candidate character, and/or calculating proximity of the overlapping points to a boundary of the printing.

In an embodiment, projecting a template set of points can include projecting a template set having a point spacing of about one-sixth of a height of the candidate character. Other point densities can be used as well, depending on an embodiment. Projecting a template set of points can include projecting a template set having uniform point spacing throughout the character as shown in FIG. 1B, or a template set having non-uniform point spacing. For example, a template set with non-uniform point spacing can have more points localized on one or more curved lines of the template set, and fewer points localized on one or more straight lines of the template set. In an embodiment, a template set can include about 20 points.

In an embodiment, the method 200 can further include selecting one or more template sets having highest assigned scores to analyze proximity of one or more template set points to a boundary of the printing of the candidate character.

Figure 4:
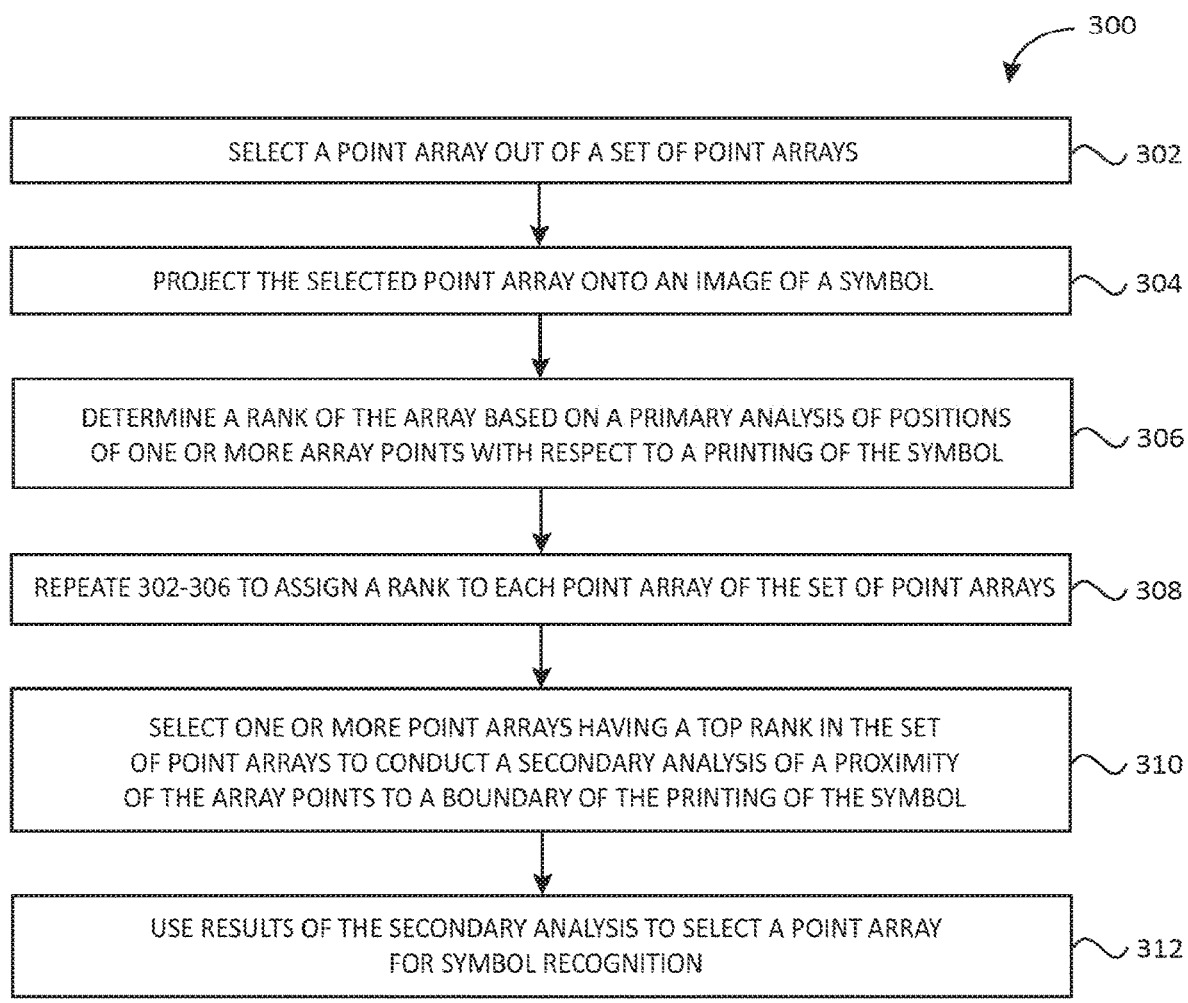
FIG. 4 schematically depicts a method for symbol recognition, according to an embodiment.

FIG. 4 shows a method 300 for symbol recognition, according to an embodiment. At 302, a point array is selected out of a set of point arrays. At 304, the selected point array is projected onto an image of a symbol. At 306, a rank of the array is determined based on a primary analysis of positions of one or more array points with respect to a printing of the symbol. At 308, 302-306 are repeated to assign a rank to each point array of the set of point arrays. At 310, one or more point arrays having a top rank in the set of point arrays are selected to conduct a secondary analysis of proximity of the array points to a boundary of the printing of the symbol. And at 312, results of the secondary analysis are used to select a point array for symbol recognition.

In an embodiment, determining a rank at 306 can include determining a number of the array points overlapping with the printing of the symbol. Additionally, the method 300 can further include determining the rank based on proximity of one or more array points to the boundary of the printing of the symbol.

In an embodiment, conducting a secondary analysis at 310 can include projecting a circle having a diameter of an approximate stroke width of the symbol around one or more points. Additionally or alternatively, conducting a secondary analysis at 310 can include generating a vector perpendicular to one or more points of the point array and measuring proximity of such points to the boundary of the printing of the symbol.

In an embodiment, the method 300 can further include applying the point array with a top rank for monospace font character recognition. For example, the method can further include applying the point array with a top rank for OCRB font character recognition.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;

U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/185432;
U.S. Patent Application Publication No. 2009/134221;
U.S. Patent Application Publication No. 2010/177080;
U.S. Patent Application Publication No. 2010/177076;
U.S. Patent Application Publication No. 2010/177707;
U.S. Patent Application Publication No. 2010/177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;

U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser, No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);
U.S. patent application Ser. No. 14/416,147 for OPTICAL READING APPARATUS HAVING VARIABLE SETTINGS filed Jan. 21, 2015 (Chen et al.);
U.S. patent application Ser. No. 14/614,706 for DEVICE FOR SUPPORTING AN ELECTRONIC TOOL ON A USER'S HAND filed Feb. 5, 2015 (Oberpriller et al.);
U.S. patent application Ser. No. 14/614,796 for CARGO APPORTIONMENT TECHNIQUES filed Feb. 5, 2015 (Morton et al.);
U.S. patent application Ser. No. 29/516,892 for TABLE COMPUTER filed Feb. 6, 2015 (Bidwell et al.);
U.S. patent application Ser. No. 14/619,093 for METHODS FOR TRAINING A SPEECH RECOGNITION SYSTEM filed Feb. 11, 2015 (Pecorari);
U.S. patent application Ser. No. 14/628,708 for DEVICE, SYSTEM, AND METHOD FOR DETERMINING THE STATUS OF CHECKOUT LANES filed Feb. 23, 2015 (Todeschini);
U.S. patent application Ser. No. 14/630,841 for TERMINAL INCLUDING IMAGING ASSEMBLY filed Feb. 25, 2015 (Gomez et al.);
U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);
U.S. patent application Ser. No. 29/519,017 for SCANNER filed Mar. 2, 2015 (Zhou et al.);
U.S. patent application Ser. No. 14/405,278 for DESIGN PATTERN FOR SECURE STORE filed Mar. 9, 2015 (Zhu et al.);
U.S. patent application Ser. No. 14/660,970 for DECODABLE INDICIA READING TERMINAL WITH COMBINED ILLUMINATION filed Mar. 18, 2015 (Kearney et al.);
U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);
U.S. patent application Ser. No. 14/662,922 for MULTIFUNCTION POINT OF SALE SYSTEM filed Mar. 19, 2015 (Van Horn et al.);
U.S. patent application Ser. No. 14/663,638 for VEHICLE MOUNT COMPUTER WITH CONFIGURABLE IGNITION SWITCH BEHAVIOR filed Mar. 20, 2015 (Davis et al.);
U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);
U.S. patent application Ser. No. 14/669,280 for TRANSFORMING COMPONENTS OF A WEB PAGE TO VOICE PROMPTS filed Mar. 26, 2015 (Funyak et al.);
U.S. patent application Ser. No. 14/674,329 for AIMER FOR BARCODE SCANNING filed Mar. 31, 2015 (Bidwell);
U.S. patent application Ser. No. 14/676,109 for INDICIA READER filed Apr. 1, 2015 (Huck);
U.S. patent application Ser. No. 14/676,327 for DEVICE MANAGEMENT PROXY FOR SECURE DEVICES filed Apr. 1, 2015 (Yeakley et al.);
U.S. patent application Ser. No. 14/676,898 for NAVIGATION SYSTEM CONFIGURED TO INTEGRATE MOTION SENSING DEVICE INPUTS filed Apr. 2, 2015 (Showering);
U.S. patent application Ser. No. 14/679,275 for DIMENSIONING SYSTEM CALIBRATION SYSTEMS AND METHODS filed Apr. 6, 2015 (Laffargue et al.);
U.S. patent application Ser. No. 29/523,098 for HANDLE FOR A TABLET COMPUTER filed Apr. 7, 2015 (Bidwell et al.);
U.S. patent application Ser. No. 14/682,615 for SYSTEM AND METHOD FOR POWER MANAGEMENT OF MOBILE DEVICES filed Apr. 9, 2015 (Murawski et al.);
U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);
U.S. patent application Ser. No. 29/524,186 for SCANNER filed Apr. 17, 2015 (Zhou et al.);
U.S. patent application Ser. No. 14/695,364 for MEDICATION MANAGEMENT SYSTEM filed Apr. 24, 2015 (Sewell et al.);
U.S. patent application Ser. No. 14/695,923 for SECURE UNATTENDED NETWORK AUTHENTICATION filed Apr. 24, 2015 (Kubler et al.);
U.S. patent application Ser. No. 29/525,068 for TABLET COMPUTER WITH REMOVABLE SCANNING DEVICE filed Apr. 27, 2015 (Schulte et al.);
U.S. patent application Ser. No. 14/699,436 for SYMBOL READING SYSTEM HAVING PREDICTIVE DIAGNOSTICS filed Apr. 29, 2015 (Nahill et al.);
U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);
U.S. patent application Ser. No. 14/702,979 for TRACKING BATTERY CONDITIONS filed May 4, 2015 (Young et al.);
U.S. patent application Ser. No. 14/704,050 for INTERMEDIATE LINEAR POSITIONING filed May 5, 2015 (Charpentier et al.);
U.S. patent application Ser. No. 14/705,012 for HANDS-FREE HUMAN MACHINE INTERFACE RESPONSIVE TO A DRIVER OF A VEHICLE filed May 6, 2015 (Fitch et al.);
U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);
U.S. patent application Ser. No. 14/707,037 for SYSTEM AND METHOD FOR DISPLAY OF INFORMATION USING A VEHICLE-MOUNT COMPUTER filed May 8, 2015 (Chamberlin);
U.S. patent application Ser. No. 14/707,123 for APPLICATION INDEPENDENT DEX/UCS INTERFACE filed May 8, 2015 (Pape);
U.S. patent application Ser. No. 14/707,492 for METHOD AND APPARATUS FOR READING OPTICAL INDICIA USING A PLURALITY OF DATA SOURCES filed May 8, 2015 (Smith et al.);
U.S. patent application Ser. No. 14/710,666 for PRE-PAID USAGE SYSTEM FOR ENCODED INFORMATION REDAING TERMINALS filed May 13, 2015 (Smith);
U.S. patent application Ser. No. 29/526,918 for CHARGING BASE filed May 14, 2015 (Fitch et al.);
U.S. patent application Ser. No. 14/715,672 for AUGUMENTED REALITY ENABLED HAZARD DISPLAY filed May 19, 2015 (Venkatesha et al.);
U.S. patent application Ser. No. 14/715,916 for EVALUATING IMAGE VALUES filed May 19, 2015 (Ackley);
U.S. patent application Ser. No. 14/722,608 for INTERACTIVE USER INTERFACE FOR CAPTURING A DOCUMENT IN AN IMAGE SIGNAL filed May 27, 2015 (Showering et al.);
U.S. patent application Ser. No. 29/528,165 for IN-COUNTER BARCODE SCANNER filed May 27, 2015 (Oberpriller et al.);
U.S. patent application Ser. No. 14/724,134 for ELECTRONIC DEVICE WITH WIRELESS PATH SELECTION CAPABILITY filed May 28, 2015 (Wang et al.);
U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);
U.S. patent application Ser. No. 14/724,908 for IMAGING APPARATUS HAVING IMAGING ASSEMBLY filed May 29, 2015 (Barber et al.);
U.S. patent application Ser. No. 14/725,352 for APPARATUS AND METHODS FOR MONITORING ONE OR MORE PORTABLE DATA TERMINALS (Caballero et al.);
U.S. patent application Ser. No. 29/528,590 for ELECTRONIC DEVICE filed May 29, 2015 (Fitch et al.);
U.S. patent application Ser. No. 29/528,890 for MOBILE COMPUTER HOUSING filed Jun. 2, 2015 (Fitch et al.);
U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);
U.S. patent application Ser. No. 14/732,870 for DATA COLLECTION MODULE AND SYSTEM filed Jun. 8, 2015 (Powilleit);
U.S. patent application Ser. No. 29/529,441 for INDICIA READING DEVICE filed Jun. 8, 2015 (Zhou et al.);
U.S. patent application Ser. No. 14/735,717 for INDICIA-READING SYSTEMS HAVING AN INTERFACE WITH A USER'S NERVOUS SYSTEM filed Jun. 10, 2015 (Todeschini);
U.S. patent application Ser. No. 14/738,038 for METHOD OF AND SYSTEM FOR DETECTING OBJECT WEIGHING INTERFERENCES filed Jun. 12, 2015 (Amundsen et al.);
U.S. patent application Ser. No. 14/740,320 for TACTILE SWITCH FOR A MOBILE ELECTRONIC DEVICE filed Jun. 16, 2015 (Bandringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method comprising:
identifying a candidate character for optical character recognition;
selecting a template from a plurality of templates to cast over the candidate character, wherein the template comprises a plurality of centerline points;
determining, using a processor, an assigned score for the selected template based on the plurality of centerline points by at least:
conducting a template matching analysis for the plurality of centerline points by at least counting a number of points that overlap with the candidate character and calculating a distance from each of the number of points that overlap with the candidate character to a boundary of the candidate character; and
calculating the assigned score based at least in part on the template matching analysis;
identifying a preferred template having a highest assigned score from the plurality of templates by comparing the assigned score of the selected template to a score for at least another template of the plurality of templates; and
using the preferred template to interpret the candidate character.

2. The method of claim 1, wherein determining, using the processor, the assigned score for the selected template further comprises:
determining positions of the plurality of centerline points with respect to a principal tracing path of the candidate character; and
calculating the assigned score based on the determined positions of the plurality of centerline points.

3. The method according to claim 2, wherein calculating the assigned score further comprises calculating a proximity of the plurality of centerline points to a center of the principal tracing path.

4. The method according to claim 2, wherein calculating the assigned score further comprises calculating a distance of the plurality of centerline points to one or more boundaries of the candidate character.

5. The method according to claim 1, wherein conducting the template matching analysis further comprises:
determining points that overlap with the candidate character; and
calculating a distance from each of the determined points that overlap with the candidate character to a boundary of the candidate character.

6. The method according to claim 1, wherein conducting the template matching analysis further comprises counting a number of points overlapping with the candidate character.

7. The method of claim 1, wherein the template comprises an OCRB font character.

8. A apparatus comprising:
a processor and a non-transitory memory including program code, the non-transitory memory and the program code configured to, with the processor, cause the apparatus to at least:
identify a candidate character for optical character recognition;
select a template from a plurality of templates to cast over the candidate character, wherein the template comprises a template set of centerline points;
determine an assigned score for the selected template based on the template set of centerline points, wherein to determine the assigned score for the selected template based on the plurality of centerline points the apparatus is caused to:
conduct a template matching analysis for the plurality of centerline points by at least counting a number of points that overlap with the candidate character and calculating a distance from each of the number of points that overlap with the candidate character to a boundary of the candidate character; and
calculate the assigned score based at least in part on the template matching analysis;
identify a preferred template from the plurality of templates having a highest assigned score by comparing the assigned score of the selected template to a score for at least another template of the plurality of templates; and
use the preferred template to identify the candidate character.

9. The apparatus of claim 8, wherein the at least one non-transitory memory and the program code that is configured to, with the processor, cause the apparatus to at least determine the assigned score for the selected template is further configured to:
determine positions of the template set of centerline points with respect to a principal tracing path of the candidate character; and
calculate the assigned score based on the determined positions of the template set of centerline points.

10. The apparatus according to claim 9, wherein the at least one non-transitory memory and the program code that is configured to, with the processor, cause the apparatus to at least calculate the assigned score is further configured to calculate a proximity of the template set of centerline points to a center of the principal tracing path.

11. The apparatus according to claim 9, wherein the at least one non-transitory memory and the program code that is configured to, with the processor, cause the apparatus to at least calculate the assigned score is further configured to calculate a distance of the template set of centerline points to one or more boundaries of the candidate character.

12. The apparatus according to claim 8, wherein the at least one non-transitory memory and the program code that is configured to, with the processor, cause the apparatus to at least conduct the template matching analysis is further configured to:
determine points that overlap with the candidate character; and
calculate a distance from each of determined points that overlap with the candidate character to a boundary of the candidate character.

13. The apparatus according to claim 8, wherein the at least one non-transitory memory and the program code that is configured to, with the processor, cause the apparatus to at least conduct the template matching analysis is further configured to count a number of points overlapping with the candidate character.

14. The apparatus of claim 8, wherein the template comprises an OCRB font character.

15. A computer program product comprising at least one non-transitory computer-readable storage medium having computer-readable program code portions stored therein, the computer-readable program code portions comprising an executable portion configured to:

identify a candidate character for optical character recognition;

select a centerline template from a plurality of centerline templates to cast over the candidate character, wherein the centerline template comprises centerline points;

determine an assigned score for the selected centerline template, wherein to determine the assigned score the executable portion is configured to:

conduct a template matching analysis for the plurality of centerline points by at least counting a number of points that overlap with the candidate character and calculating a distance from each of the number of points that overlap with the candidate character to a boundary of the candidate character; and calculate the assigned score based at least in part on the template matching analysis;

identify a preferred centerline template from the plurality of centerline templates having a highest assigned score by comparing the assigned score of the centerline template to a score for at least another centerline template of the plurality of centerline templates; and use the preferred centerline template to identify the candidate character.

16. The computer program product of claim 15, wherein the computer-readable program code portions comprising the executable portion are configured to further:

determine positions of the centerline points with respect to a principal tracing path of the candidate character; and calculate the assigned score based on the determined positions of the centerline points.

17. The computer program product according to claim 16, wherein the computer-readable program code portions comprising the executable portion are configured to further to at least one of calculate a proximity of the centerline points to a center of the principal tracing path and calculate a distance of the centerline points to one or more boundaries of the candidate character.

18. The computer program product of claim 15, wherein the template comprises an OCRB font character.

* * * * *